United State
Müller

[11] 3,810,013
[45] May 7, 1974

[54] ELECTRO-OPTICAL DEVICE FOR MEASURING THE VOLTAGE ON A HIGH-VOLTAGE CONDUCTOR

[75] Inventor: Willi Müller, Berlin, Germany

[73] Assignee: Siemens Aktiengesellschaft, Munchen, Germany

[22] Filed: June 5, 1972

[21] Appl. No.: 259,613

[30] Foreign Application Priority Data
June 11, 1971 Germany.............................. 2130046

[52] U.S. Cl. ................................... 324/96, 350/150
[51] Int. Cl. ....................... G01r 19/00, G01r 31/02
[58] Field of Search ............... 324/96; 350/150, 151

[56] References Cited
UNITED STATES PATENTS

| | | | |
|---|---|---|---|
| 3,168,611 | 2/1965 | Strauss................................. | 350/150 |
| 3,363,174 | 1/1968 | Hudson et al......................... | 324/96 |
| 3,466,541 | 9/1969 | Bernard et al........................ | 324/96 |
| 3,629,703 | 12/1971 | Bernard ................................ | 324/96 |
| 3,675,125 | 7/1972 | Jaecklin ................................ | 324/96 |
| 3,558,215 | 1/1971 | De Lang et al....................... | 350/150 |
| 3,581,202 | 5/1971 | Pelenc et al. .......................... | 324/96 |
| 3,597,683 | 8/1971 | Saito et al.............................. | 324/96 |
| 3,605,013 | 9/1971 | Yoshikawa et al. ............ | 350/151 X |

FOREIGN PATENTS OR APPLICATIONS

| | | | |
|---|---|---|---|
| 675,030 | 7/1952 | Great Britain......................... | 324/30 |
| 1,170,540 | 11/1969 | Great Britain......................... | 324/96 |

*Primary Examiner*—Gerard R. Strecker
*Attorney, Agent, or Firm*—Kenyon & Kenyon Reilly Carr & Chapin

[57] ABSTRACT

A measuring device for measuring voltages of high voltage conductors wherein a measuring detector composed of a light wave conductor which is disposed in an electric field produced by said voltage and is penetrated by polarized light so that the polarization plane of the light waves is rotated in proportion to the magnitude of the voltage to be measured and an evaluation device is provided which converts the rotation of the plane of the polarized light into a low voltage electrical quantity proportional to the magnitude of the high voltage being measured.

14 Claims, 3 Drawing Figures

ELECTRO-OPTICAL DEVICE FOR MEASURING THE VOLTAGE ON A HIGH-VOLTAGE CONDUCTOR

BACKGROUND OF THE INVENTION

The invention relates to a device for measuring voltages of high-voltage conductors. More particularly, the invention relates to such a device wherein polarized light is used to measure the voltage on the high-voltage conductor.

Heretofore in most instances, inductive or capacitive voltage transformers were used for measuring high voltages. The use of inductive voltage transformers encounters difficulties when relatively high voltages are measured and involves a very high expenditure for the required insulation. Thus the use of inductive voltage transformers is not desirable for measuring very high voltages because of the cost inherent in their application.

Capacitive voltage transformers can be used for measuring very-high voltages with less initial expense. However, such transformers have the fundamental disadvantage that saw-tooth oscillations tend to appear and the suppression of these oscillations requires additional devices that entail rather considerable additional cost.

SUMMARY OF THE INVENTION

It is an object of the invention to provide a device for measuring voltages of high-voltage conductors which can be economically produced even when constructed for measuring very-high voltages.

It is another object of the invention to provide a measuring device for measuring the voltages of high and very-high voltage conductors which eliminates the need for equipment such as inductive and capacitive transformers.

It is a further object of the invention to provide a measuring device which uses polarized light to provide an indication of the voltage on a high-voltage conductor. According to a feature of the invention, light-conductive detection means is placed in the electric field of the voltage to be measured. The detection means includes a light-wave conductor through which passes polarized light, so that the light undergoes a rotation of its polarization plane in proportion to the magnitude of the voltage to be measured. Suitable light-wave conductors which can be used are index-gradient conductors, gradient fibers and light conductors which are known under the trade name SELFOC GUIDE which can conduct linearly polarized light rays without disrupting the polarization of the light.

The light-wave conductor detection means is preferably in the form of a toroidal coil disposed in surrounding relation to the high-voltage conductor.

An evaluation means is provided at a low-voltage potential whereby the rotated polarized light is converted into an electrically measured quantity that is proportional to the voltage being measured.

The invention utilizes the knowledge that linearly polarized light which passes through materials that are situated in strong electric or magnetic fields is rotated in its polarization plane with respect to the field. If, as in the instant invention, measures are taken to ensure that the light-wave conductor is subject to only the electric field intensity in transverse direction, then the turning of the polarization plane of the light on the high-voltage side is proportional to the voltage to be measured.

In order to shield the toroidal coil against magnetic interference, this coil is preferably provided at its end faces with ring-shaped shielding hoods.

The measuring device of the invention can be employed to particular advantage for measuring voltages in fully-insulated, metal-clad, high-voltage installations comprising an inner conductor and an outer tube concentric to the inner conductor. The toroidal coil is placed inside a ring-shaped expansion of the outer tube.

The ring-shaped expansion of the outer tube is preferably partially covered inside by metal rings which form shielding rings for the end-face regions of the toroidal coil which eliminate unwanted interference by the magnetic fields.

According to the invention, the evaluation means of the device can be constructed in various ways. It is preferable that the evaluation means contain a magneto-optical modulator and amplifier circuit means. The magneto-optical modulator preferably consists of a coil wound of a light-wave conductor and an electrical winding mounted upon the coil. The electrical winding is fed with a current supplied by the amplifier circuit means.

Light-wave conductors exhibit a specific temperature dependence which is manifested by a rotation of the polarization plane of the light in the conductor in dependence upon the temperature of the conductor. To prevent this temperature dependence from affecting the measurement, it is advantageous to provide a reference winding made of a light-wave conductor equipped with shielding. Polarized light is passed through this conductor. The reference winding is provided with an evaluating component in the evaluation device for evaluating the rotation of the polarization plane which occurred in the reference winding.

The evaluation device preferably comprises an additional magneto-optical modulator for the reference winding; this modulator consists of a coil wound of a light-wave conductor and an electrical winding mounted upon this coil.

It is preferable to use light-wave conductors for transmitting the polarized light between the toroidal coil or the reference winding and the evaluation device. These light-wave conductors are preferably the end portions of the respective light conductors of toroidal coil and of the reference winding. This eliminates the problems of coupling the light-wave conductors to the toroidal coil or the reference winding.

According to another feature of the invention, behind each magneto-optical modulator of the evaluation device there is disposed an optical analyzer for splitting the light from the corresponding modulator into two light beams. For each analyzer, there are two photocells to which the respective component beams are presented. The two photo-cells corresponding to each analyzer are connected with respective difference amplifiers and these difference amplifiers are connected at their outputs with an additional difference amplifier which supplies current, via a power amplifier, to a load positioned in the circuit of the electrical windings of the modulators of the evaluation device. The voltage which appears across the load is then proportional to the voltage on the high-voltage line being measured as corrected for temperature by the reference winding.

The device according to the invention includes polarized light supply means for supplying polarized light having a polarization plane. The polarized light supply means can comprise a light source such as a laser arranged at low-voltage potential.

In the embodiment of the device equipped with a reference winding, it is preferable to connect a beam splitter after the light source. Light-wave conductors extend from this beam splitter and lead respectively to the toroidal coil and the reference winding.

Preferably, as mentioned, the light source is a laser diode and the supply means can further include a pulse generator connected to this diode. According to another feature, a synchronous demodulator is provided as a component of the evaluation device and is connected to the pulse generator via a phase shifter. It is advantageous to use laser diodes for reasons of lower cost and extended operational life.

The evaluation device can be configured in various ways and does not necessarily have to include magneto-optical modulators. If desired, the evaluation device can be provided with electro-optical modulators.

Although the invention is illustrated and described herein as a device for measuring voltage on a high-voltage line, it is nevertheless, not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS

Figure 1:
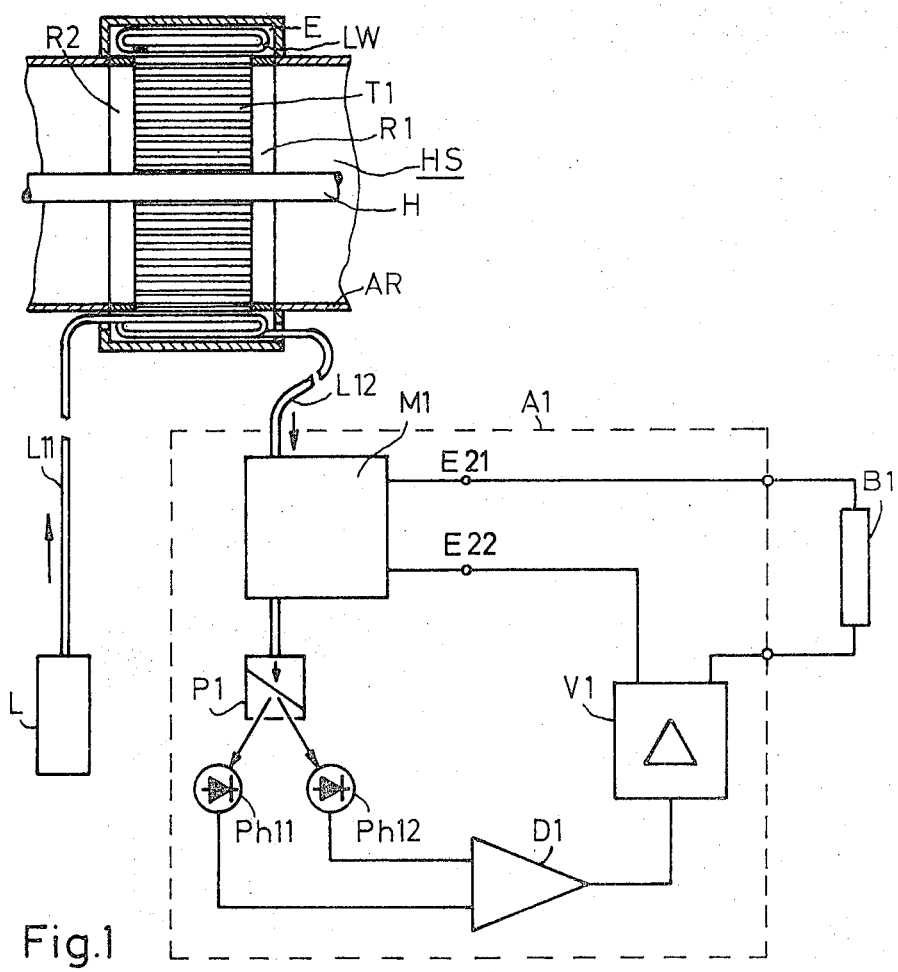
FIG. 1 is a schematic diagram illustrating the measuring device according to the invention arranged to measure the voltage on a high-voltage conductor of a high-voltage switching installation.

Referring to FIG. 1, the device for measuring voltages of high-voltage conductors according to the invention utilizes linearly polarized light emitted by a light source L which can, for example, be a laser. The polarized light is transmitted through light conductor L11 to a toroidal coil T1 which is wound with a light-wave conductor LW.

The toroidal coil T1 is situated in ring-shaped expansion means in the form of an annular expansion E of a grounded outer tube AR of a high-voltage switch installation HS. A high-voltage conductor H is disposed in the outer tube AR and conducts a current that produces a rotational magnetic field inside the outer tube AR of the high-voltage switch installation HS. To prevent the magnetic field lines from affecting the light-wave conductor LW of the toroidal coil T1 in an undesirable manner, the ring-shaped expansion E is partially covered on its end faces by metal annular members in the form of respective shielding rings R1 and R2. However, the light-wave conductor LW of the toroidal coil T1 is influenced by the electric field intensity in a transverse direction. As a result, the linearly polarized light which passes through the light-wave conductor LW is rotated in its polarization plane in dependence upon the electric field intensity and, thus, also in dependence upon the voltage between the high-voltage conductor H and the grounded outer tube AR.

The light which is rotated in its polarization plane is supplied through light transmission means in the form of another light conductor L12, to an evaluation means A1 operating on low-voltage potential. The device A1 contains a modulator M1 for rotating back the polarization plane of the light.

Arranged after the modulator M1, is an analyzer prism P1 which splits the incident light beam into two component light beams having respective polarization planes perpendicular to each other and having respective intensities that change in opposition relative to each other in proportion to the angle of rotation of the polarization plane of the incident beam. Inside two photo-cells in the form of photo-diodes Ph11 and Ph12, the component light beams are converted into electrical quantities and are then fed to amplifier circuit means comprising a difference amplifier D1. The optical analyzer and the photo-cells thus jointly constitute transducer means optically connected to the modulator M1 for providing to the amplifier D1 an electrical signal indicative of the rotation of the polarization plane. A power amplifier V1 is connected in cascade after the difference amplifier D1 and drives a current through a load B1 and the modulator M1 such that the rotation of the polarization plane which occurred in the toroidal coil is cancelled. The voltage across load B1 is then proportional to the voltage to be measured. The modulator M1 is shown configured as a magneto-optical modulator.

It is advantageous to configure the toroidal coil T1 so that its ends which are led from the coil proper are long enough to constitute the light-wave conductors L11 and L12.

Figure 2:
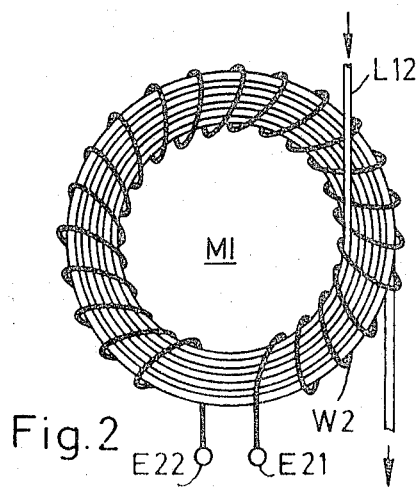
FIG. 2 shows a magneto-optical modulator that can constitute part of the evaluation means of the measuring device of FIG. 1.

The magneto-optical modulator M1 of FIG. 1 may be built in the manner shown in FIG. 2. The light-wave conductor L12 is wound into a coil that is enclosed by another winding W2 in the form of an electrical conductor. The winding ends E21 and E22 of the winding W2, are connected with a terminal of load B1 and an output of amplifier V1 shown in FIG. 1. The current delivered by the amplifier V1 flows through winding W2 and creates a magnetic field in the winding formed of light-wave conductor L12. Because of the configuration of the evaluation device A1, this magnetic field has an intensity which causes the polarization plane in the modulator M1 to balance the rotation of this plane occurring at high-voltage potential. The current which flows through winding W2 and through the load B1 is then proportional to the voltage being measured on the high-voltage conductor H.

Figure 3:
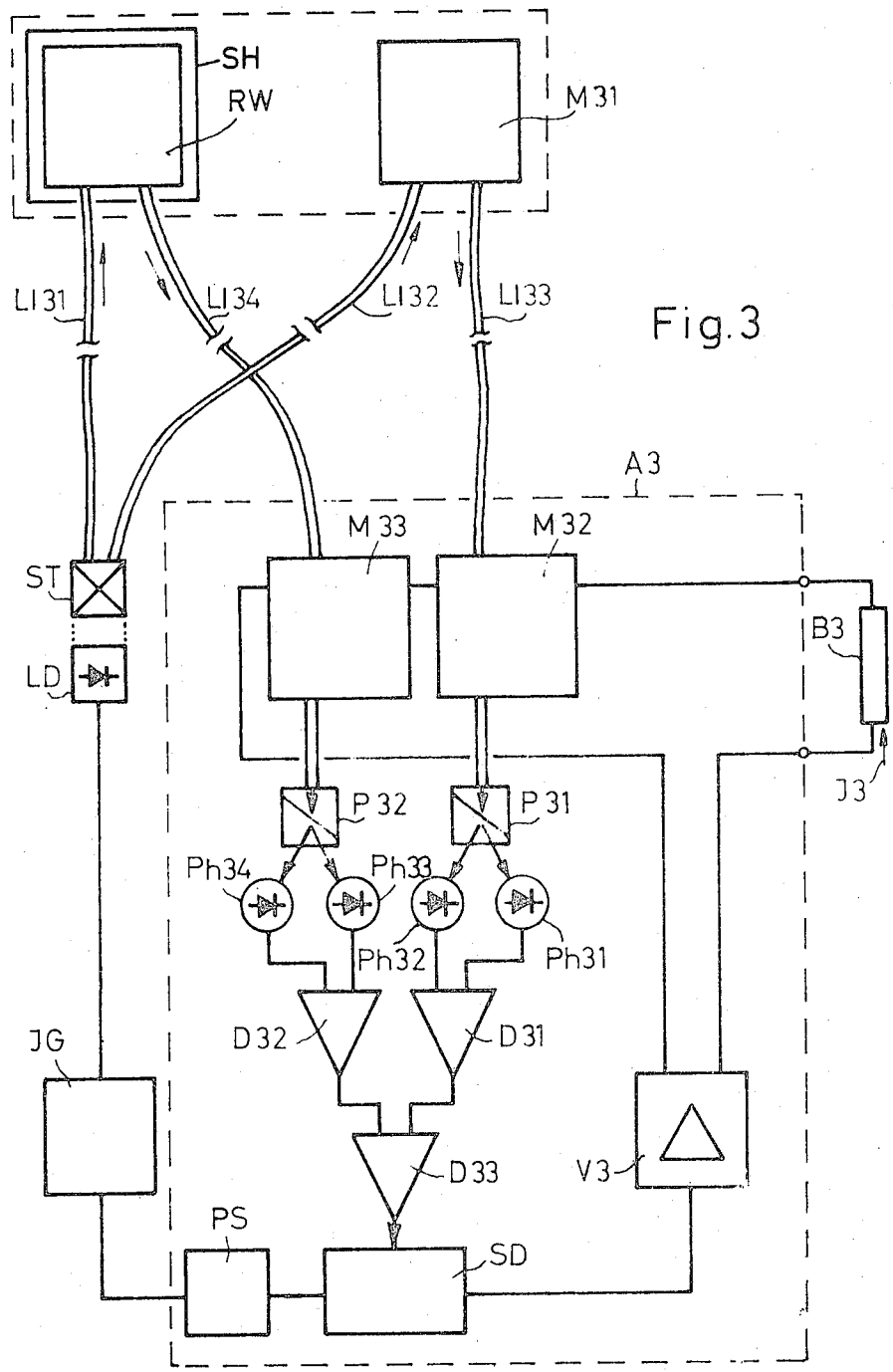
FIG. 3 is a schematic diagram depicting another embodiment according to the invention wherein a shielded reference winding is provided to preclude error because of changes in temperature.

In the embodiment of the measuring device of the invention shown in FIG. 3, linearly polarized light is emitted by a laser diode LD, which is controlled by an impulse generator JG. After the laser diode LD, there is provided a beam splitter ST from which extend respective light-wave conductors L131 and L132. Polarized light is transmitted through light-wave conductor L132 in form of light pulses to a modulator M31. The modulator M31 can have a configuration identical to modulator T1 of FIG. 1 and so comprises a toroidal coil wound from a light-wave conductor and disposed in the electric field of the high-voltage line. The polarization plane of the light transmitted to modulator M31 is rotated therein in dependence upon the magnitude of the voltage to be measured, and the light modulated in this way is conducted to the evaluation device A3 via another light-wave conductor L133.

In the evaluation device A3, light-wave conductor L133 is connected to another modulator M32 which may be constructed as illustrated in FIG. 2. An analyzer prism P31 is connected after the magneto-optical modulator M32. In the same manner as previously shown in FIG. 1, the prism P31 is optically connected to photo-diodes Ph31 and Ph32 which feed a difference amplifier D31.

For the purpose of eliminating temperature influences upon the measured result, the device is provided with a shielded reference winding RW comprising a reference light-wave conductor which receives polarized light from the laser diode LD via light-wave conductor L131. In the reference winding RW which is always subjected to the same temperatures as modulator M31 with the toroidal coil, the polarized light experiences a rotation of its polarization plane, in dependence upon the temperature. The light modulated in this manner is transmitted through another light-wave conductor L134 to determination means comprising an additional modulator M33 in the evaluation device A3. The additional modulator M33 may be constructed like the modulator of FIG. 2. A further analyzer prism P32 is connected in cascade after the modulator M33 wherein the light supplied to the prism is split into two component light beams which impinge upon photo-diodes Ph33 and Ph34, respectively. A further difference amplifier D32 is connected to photo-diodes Ph33 and Ph34.

To compensate the temperature influences, both difference amplifiers D31 and D32 are connected to an additional difference amplifier D33. A synchronous demodulator SD is connected in cascade after amplifier D33. The synchronous demodulator SD is connected, via a phase shifter PS, to pulse generator JG, so that the measured quantity can be modulated in the synchronous demodulator SD.

A power amplifier V3 is connected to the synchronous demodulator SD and feeds a current to the magneto-optical modulators M32 and M33 via a load B3; this current is such that the polarization plane of the light modulated on the high-voltage side is rotated back in the modulators. The current J3 which flows through the load B3 is then proportional to the voltage to be measured independent of any temperature variations.

The measuring device according to the invention measures voltages on high-voltage conductors and can be produced at relatively low cost; this is also true for configurations thereof intended for measuring very-high voltages. Because of the toroidal coil made of a light-wave conductor, the measuring device of the invention is particularly suitable for measuring voltages of fully-insulated, metal-clad, high-voltage switching installations.

The shielding for the reference winding RW is indicated schematically in FIG. 3 by reference designation SH. The shield SH prevents the magnetic and electrical fields of the high-voltage line from introducing unwanted rotations of the polarization plane of the light conducted in the light-wave conductor of the reference winding RW.

What is claimed is:

1. A device for measuring voltage on a high-voltage line producing a rotational magnetic field in response to the current conducted therethrough and radiating an electric field having an intensity indicative of the value of the voltage on the line, the device comprising polarized light supply means for providing polarized light having a polarization plane, an optical fiber light-wave conductor optically connected to said supply means, at least a portion of said light-wave conductor being disposed in the electric field of the voltage for exposing the polarized light thereto whereby the polarization plane of the polarized light is rotated in dependence upon the intensity of the electric field, said portion of said light-wave conductor being arranged with respect to the direction of the magnetic field so as to preclude the same from effecting an undesired rotation of the polarization plane, and evaluation means optically connected to said light-wave conductor for translating the rotation of the polarization plane into an electric quantity proportional to the voltage on the line.

2. The device of claim 1 wherein said light-wave conductor being connected to said evaluation means whereby said evaluation means is electrically isolated from the voltage on the high-voltage line.

3. The device of claim 1 wherein said said portion of said light-wave conductor being wound to define a toroidal coil disposed in surrounding relation to the high-voltage line.

4. The device of claim 3 wherein said toroidal coil has axial end faces, said coil further comprising ring-shaped shields disposed at said end faces to shield against unwanted interference by the magnetic field.

5. The device of claim 3 for measuring voltage on a high-voltage line including a conductor arranged in a fully insulated, metal-clad, high-voltage switching installation having an outer tube in surrounding relation to the conductor, said outer tube having ring-shaped expansion means for accomodating said toroidal coil therein.

6. The device of claim 5 wherein said toroidal coil has axial end faces and further has metal annular members corresponding to said end faces, said metal annular members being disposed within the region enclosed by said expansion means for partially closing said region, said annular members thereby constituting shielding rings for said end faces against interference by the magnetic field.

7. A device for measuring voltage on a high-voltage line producing a rotational magnetic field in response to the current conducted therethrough and radiating an electric field having an intensity indicative of the value of the voltage on the line, the device comprising polarized light supply means for providing polarized light having a polarization plane, a light-wave conductor optically connected to said supply means, at least a portion of said light-wave conductor being disposed in the electric field of the voltage for exposing the polarized light thereto whereby the polarization plane of the polarized light is rotated in dependence upon the intensity of the electric field, said portion of said light-wave conductor being arranged with respect to the direction of the magnetic field so as to preclude the same from effecting an undesired rotation of the polarization plane, and evaluation means optically connected to said light-wave conductor for translating the rotation of the polarization plane into an electric quantity proportional to the voltage on the line, said light-wave conductor being connected to said evaluation means whereby said evaluation means is electrically isolated from the voltage on the high-voltage line, said evaluation means comprising a magnetic-optical modulator having a light-wave conductor wound into a coil and optically connected to said first-mentioned light-wave conductor, an electrical winding disposed on said coil, amplifier circuit means electrically connected to said electrical winding, transducer means optically connected to said coil for supplying an electrical signal to said amplifier circuit means indicative of the rotation of the polarization plane of said polarized light, whereby said amplifier circuit means drives a current through said electrical winding sufficient to cancel said rotation, said current being said electrical quantity proportional to the value of the voltage on the high-voltage line.

8. The device of claim 7, wherein said amplifier circuit means comprises a differential amplifier, and said transducer means comprises an optical analyzer optically connected to said coil for splitting the polarized light conducted in said coil into two component beams having respective polarization planes perpendicular to each other and having respective intensities that change in opposition relative to each other, and two photo-cells disposed in the paths of said beams respectively, said photo-cells being connected to respective inputs of said differential amplifier.

9. The device of claim 8, wherein said said first-mentioned light-wave conductor is optically connected to said coil of said magneto-optical modulator.

10. The device of claim 9, wherein said polarized light-supply means comprises a light source optically connected to said first-mentioned light-wave conductor whereby said light source is electrically isolated from the voltage on the high-voltage line.

11. A device for measuring voltage on a high-voltage line producing a rotational magnetic field in response to the current conducted therethrough and radiating an electric field having an intensity indicative of the value of the voltage on the line, the device comprising polarized light supply means for providing polarized light having a polarization plane, a light-wave conductor optically connected to said supply means, at least a portion of said light-wave conductor being disposed in the electric field of the voltage for exposing the polarized light thereto whereby the polarization plane of the polarized light is rotated in dependence upon the intensity of the electric field, said portion of said light-wave conductor being arranged with respect to the direction of the magnetic field so as to preclude the same from effecting an undesired rotation of the polarization plane, evaluation means optically connected to said light-wave conductor for translating the rotation of the polarization plane into an electric quantity proportional to the voltage on the line, said light-wave conductor being connected to said evaluation means whereby said evaluation means is electrically isolated from the voltage on the high-voltage line, and a reference light-wave conductor optically connected to said supply means and positioned so as to be subjected to the same temperature as said first-mentioned light-wave conductor, whereby the polarization plane of the polarized light conducted in said reference light-wave conductor is rotated in dependence upon the temperature, and shielding means surrounding said reference light-wave conductor to prevent the electrical and magnetic fields of the high-voltage line from introducing unwanted rotations of the polarization plane of the light conducted therein, said evaluation means comprising determination means optically connected to said reference light-wave conductor for translating the rotation of the polarization plane produced by the temperature into an electrical reference quantity.

12. A device for measuring voltage on a high-voltage line producing a rotational magnetic field in response to the current conducted therethrough and radiating an electric field having an intensity indicative of the value of the voltage on the line, the device comprising polarized light supply means for providing polarized light having a polarization plane, a light-wave conductor optically connected to said supply means, at least a portion of said light-wave conductor being disposed in the electric field of the voltage for exposing the polarized light thereto whereby the polarization plane of the polarized light is rotated in dependence upon the intensity of the electric field, said portion of said light-wave conductor being arranged with respect to the direction of the magnetic field so as to preclude the same from effecting an undesired rotation of the polarization plane, evaluation means optically connected to said light-wave conductor for translating the rotation of the polarization plane into an electric quantity proportional to the voltage on the line, said light-wave conductor being connected to said evaluation means whereby said evaluation means is electrically isolated from the voltage on the high-voltage line, and a reference light-wave conductor optically connected to said supply means and positioned so as to be subjected to the same temperature as said first-mentioned light-wave conductor, whereby the polarization plane of the polarized light conducted in said reference light-wave conductor is rotated in dependence upon the temperature, and shielding means surrounding said reference light-wave conductor to prevent the electrical and magnetic fields of the high-voltage line from introducing unwanted rotations of the polarization plane of the light conducted therein, said evaluation means comprising a first magneto-optical modulator including a light-wave conductor wound into a coil and optically connected to said first-mentioned light-wave conductor, and an electric winding disposed on said coil, a second magneto-optical modulator including a light-wave conductor wound into a coil and optically connected to said reference light-wave conductor, and an electric winding disposed on said last-mentioned coil, amplifier circuit means electrically connected to said electrical windings, first transducer means and second transducer means optically connected to said coil of said first modulator and to said coil of said second modulator respectively for providing respective electrical signals to said amplifier circuit means indicative of the rotation of the polarization plane in dependence upon the intensity of the electric field and indicative of the rotation of the polarization plane in dependence upon the temperature respectively, whereby said amplifier circuit means drives a current through said electric windings sufficient to cancel said rotations, said current being an electrical, temperature compensated quantity proportional to the value of the voltage on the high-voltage line.

13. A device for measuring voltage on a high-voltage line radiating an electric field having an intensity indicative of the value of the voltage on the line which comprises: polarized light supply means for providing polarized light having a polarization plane; light-conductive detection means optically connected to said supply means and disposed in the electric field of the voltage for exposing the polarized light thereto whereby the polarization plane of the polarized light is rotated in dependence upon the intensity of the electric field; evaluation means operatively connected to said detection means for translating the rotation of the polarization plane into an electrical quantity proportional to the voltage on the line, said detection means being optically connected to said evaluation means by light transmission means whereby said evaluation means is electrically isolated from the voltage on the high-voltage line, said light-conductive detection means including a light-wave conductor disposed in the electric field of the line; a reference light-wave conductor optically connected to said supply means and positioned so as to be subjected to the same temperature as said first-mentioned light-wave conductor whereby the polarization plane of the polarized light conducted in said reference light-wave conductor is rotated in dependence upon the temperature; and shielding means surrounding said reference light-wave conductor to prevent the electrical and magnetic fields of the high-voltage line from introducing unwanted rotations of the polarization plane of the light conducted therein; said evaluation means comprising: a first magneto-optical modulator including a light-wave conductor wound into a coil and optically connected to said light-wave conductor of said detection means; and an electric winding disposed on said coil; a second magneto-optical modulator including a light-wave conductor wound into a coil and optically connected to said reference light-wave conductor, and an electric winding disposed on said last-mentioned coil; amplifier circuit means electrically connected to said electrical windings; first transducer means and second transducer means optically connected to said coil of said first modulator and to said coil of said second modulator respectively for providing respective electrical signals to said amplifier circuit means indicative of the rotation of the polarization plane in dependence upon the intensity of the electric field and indicative of the rotation of the polarization plane in dependence upon the temperature respectively whereby said amplifier circuit means drives a current through said electric windings sufficient to cancel said rotations, said current being an electrical, temperature compensated quantity proportional to the value of the voltage on the high-voltage line; said amplifier circuit means comprising a load resistor electrically connected to said electrical windings, first and second differential amplifiers, and an additional differential amplifier connected to the respective outputs of said first and second amplifiers, a power amplifier connected to the output of said additional amplifier for supplying a current to said load and said electric windings, said first transducer means comprising an optical analyzer optically connected to said coil of said first modulator for splitting the polarized light conducted in said last-mentioned coil into two component beams having respective polarization planes perpendicular to each other and having respective intensities that change in opposition relative to each other, and two photo-cells disposed in the paths of said beams respectively, said photo-cells being connected to respective inputs of said first differential amplifier, and said second transducer means likewise comprising an optical analyzer optically connected to said coil of said second modulator for splitting the polarized light conducted in said last-mentioned coil into two component beams having respective polarization planes perpendicular to each other and having respective intensities that change in opposition relative to each other, and two photo-cells disposed in the paths of said last-mentioned beams respectively, said last-mentioned photo-cells being connected to respective inputs of said second differential amplifier, whereby said current supplied by said power amplifier is sufficient to cancel said rotations and is an electrical, temperature compensated quantity proportional to the value of the voltage on the high-voltage line.

14. The device of claim 1, said portion of said light-wave conductor being arranged perpendicular to the direction of the magnetic field.

* * * * *